(12) United States Patent
Fritze et al.

(10) Patent No.: US 6,271,164 B1
(45) Date of Patent: Aug. 7, 2001

(54) SUPPORTED CATALYST SYSTEM, PROCESS FOR ITS PRODUCTION AND ITS USE IN POLYMERIZING OLEFINS

(76) Inventors: Cornelia Fritze, Geisenheimer Str: 97, 60529 Frankfurt; Bernd Bachmann, Kreuzheck 4, 65817 Eppstein; Frank Küber, Bleibiskopfstr: 10, 61440 Oberursel, all of (DE)

( * ) Notice: Subject to any disclaimer, the term of this patent is extended or adjusted under 35 U.S.C. 154(b) by 0 days.

(21) Appl. No.: 09/101,249

(22) PCT Filed: Sep. 18, 1996

(86) PCT No.: PCT/EP96/04071

§ 371 Date: Nov. 10, 1999

§ 102(e) Date: Nov. 10, 1999

(87) PCT Pub. No.: WO97/11775

PCT Pub. Date: Apr. 3, 1997

(30) Foreign Application Priority Data

Sep. 28, 1995 (EP) .................................................. 95115278

(51) Int. Cl.[7] ................ B01J 31/38; C08F 4/16

(52) U.S. Cl. ............ 502/104; 502/117; 502/152; 526/127; 526/160; 526/943; 526/348.6

(58) Field of Search .................. 526/351, 348.6, 526/160, 943; 502/104, 117, 152; 556/53

(56) References Cited

FOREIGN PATENT DOCUMENTS 0 619 326 A1 * 10/1994 (EP) .
2 124 240 * 7/1982 (GB) .
WO 95/11263 * 4/1995 (WO) .

* cited by examiner

*Primary Examiner*—David W. Wu
*Assistant Examiner*—R. Harlan

(57) ABSTRACT

A catalyst system comprises at least one metallocene and at least one passivated support and preferably at least one cocatalyst. The passivated support is prepared by treating at least one inorganic oxide with at least one organometallic compound, preferably in an inorganic solvent. A polymer having a melting point of ≧158° C., a proportion of reverse insertions of <0.2% and a triad tacticity of >98.0% can be obtained using this catalyst system.

9 Claims, 2 Drawing Sheets

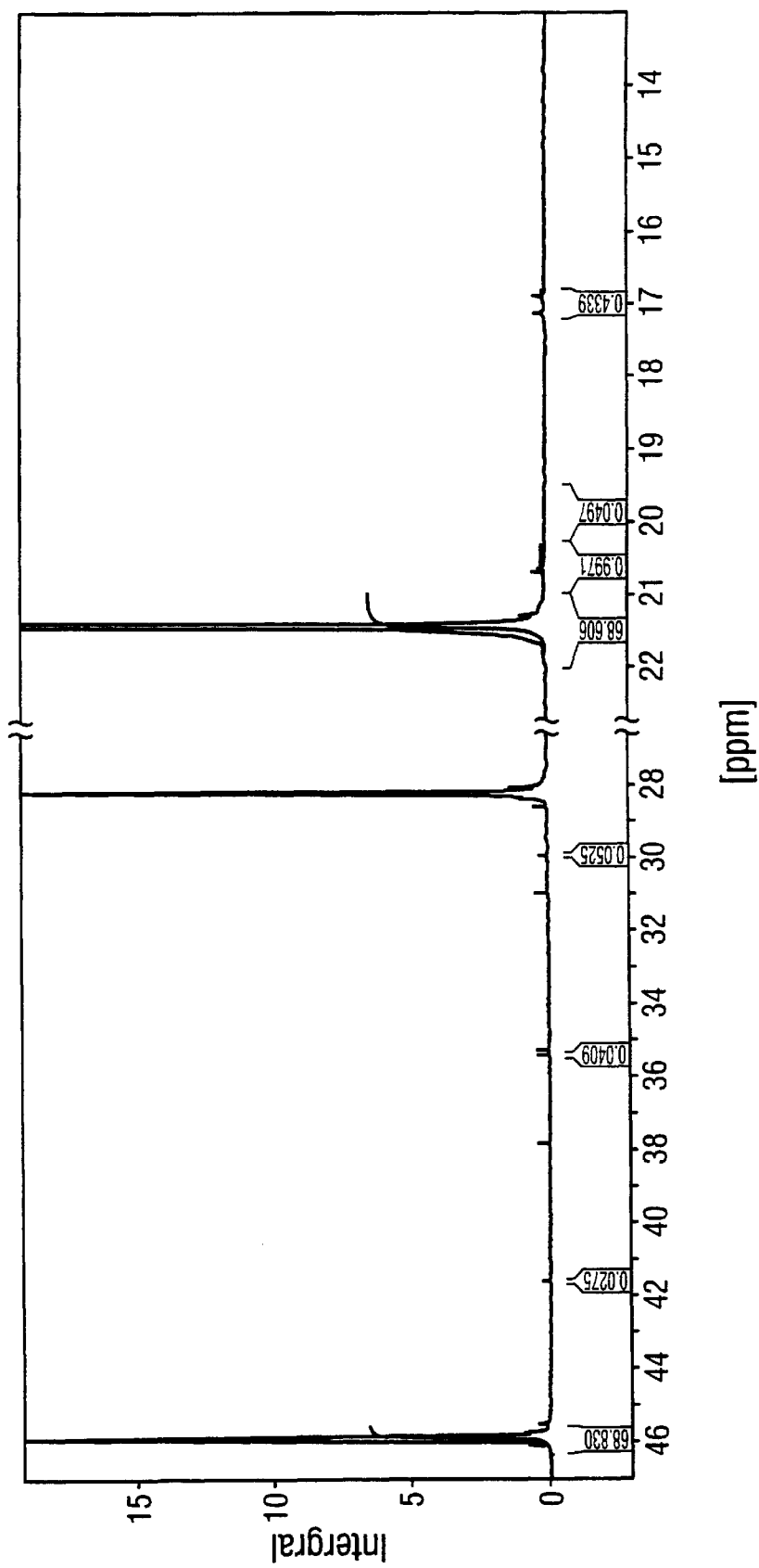
Fig. 1: Extracts from a 13C-NMR spectrum of a polypropylene described in Example 12

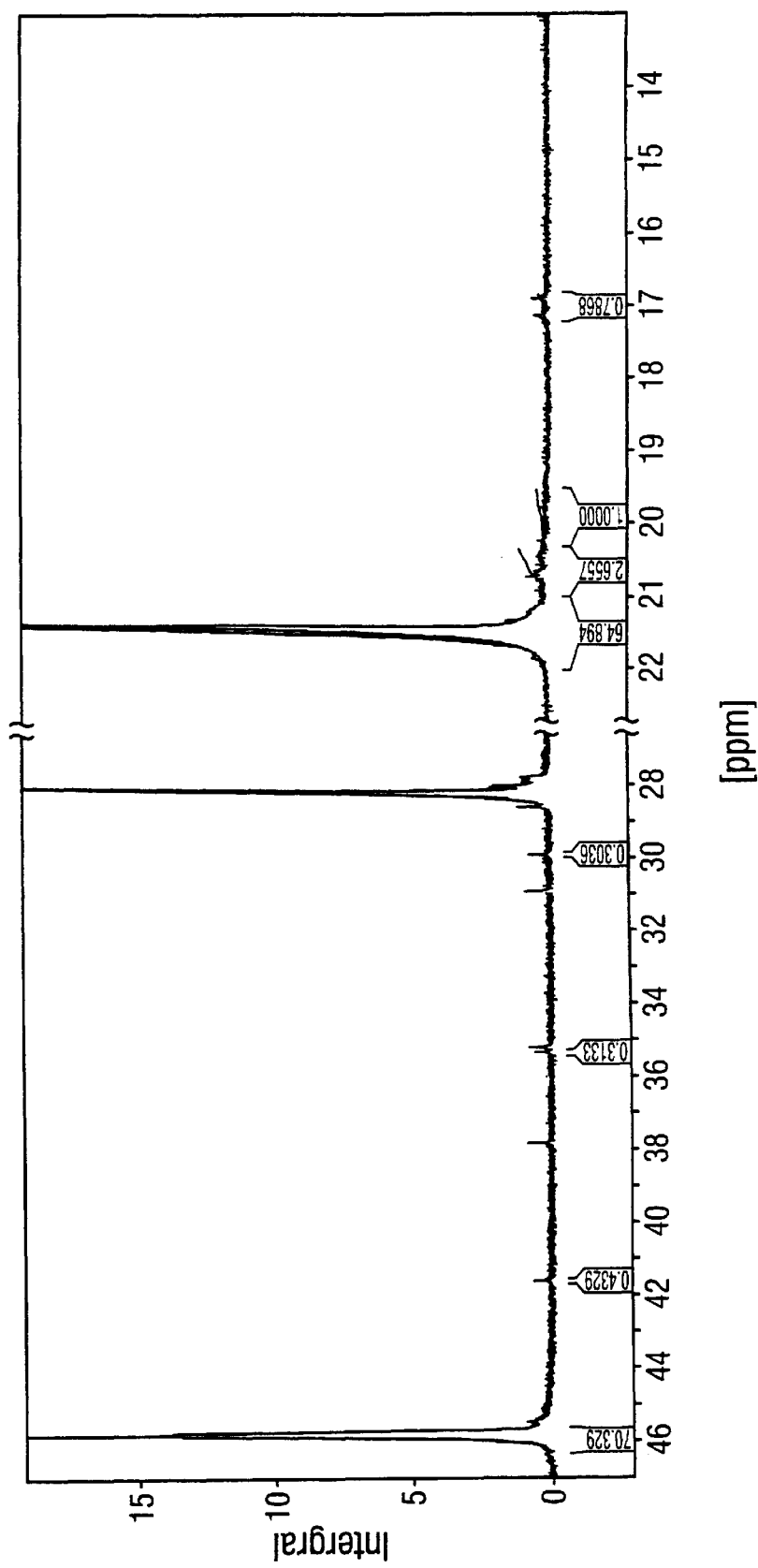
Fig. 2: Extracts from a ¹³C-NMR spectrum of a polypropylene described in Example 4

SUPPORTED CATALYST SYSTEM, PROCESS FOR ITS PRODUCTION AND ITS USE IN POLYMERIZING OLEFINS

The present invention relates to a highly active, supported catalyst system which can advantageously be used in olefin polymerization and to a process for its preparation, and also to polymers which are prepared using the supported catalyst system.

Processes for preparing polyolefins with the aid of soluble, homogeneous catalyst systems comprising a transition metal component of the metallocene type and a cocatalyst component of the aluminoxane, Lewis acid or ionic type are known. These catalysts give polymers and copolymers having a narrow molar mass distribution with high activity.

In polymerization processes using soluble, homogeneous catalyst systems, heavy deposits form on reactor walls and stirrer if the polymer is obtained as a solid. These deposits are always formed by agglomeration of the polymer particles if metallocene and/or cocatalyst are present in dissolved form in the suspension. Such deposits in the reactor systems have to be removed regularly, since they quickly reach considerable thicknesses, have a high strength and prevent heat transfer to the cooling medium. Furthermore, homogeneous catalyst systems cannot be used for preparing polyolefins in the gas phase.

To avoid deposit formation in the reactor, the use of supported catalyst systems in which the metallocene and/or the aluminum compound serving as cocatalyst are fixed on an inorganic support material have been proposed.

EP 576 970 A1 discloses a catalyst system comprising a metallocene of the formula

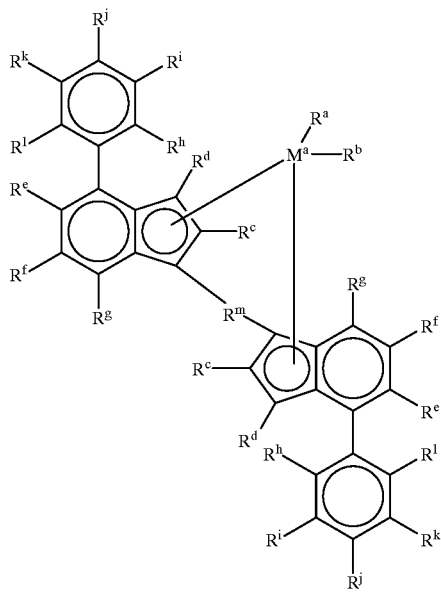

where $M^a$ is a metal of group IVb, Vb or VIb of the Periodic Table, $R^a$ and $R^b$ are identical or different and are each a hydrogen atom, a $C_1$–$C_{10}$-alkyl group, a $C_1$–$C_{10}$-alkoxy group, a $C_6$–$C_{10}$-aryl group, a $C_6$–$C_{10}$-aryloxy group, a $C_2$–$C_{10}$-alkenyl group, a $C_7$–$C_{40}$-arylalkyl group, a $C_7$–$C_{40}$-alkylaryl group, a $C_8$–$C_{40}$-arylalkenyl group, an OH group or a halogen atom, the radicals $R_c$ are identical or different and are each a hydrogen atom, a halogen atom, a $C_1$–$C_{10}$-alkyl group which may be halogenated, a $C_6$–$C_{10}$-aryl group, an —$NR^P_2$, —$SR^P$, —$OSiR^P_3$— or —$PR^P_2$ radical, where $R^P$ is a halogen atom, a $C_1$–$C_{10}$-alkyl group or a $C_6$–$C_{10}$-aryl group, $R^d$ to $R^1$ are identical or different and are as defined for $R^c$, or adjacent radicals $R^d$ to $R^1$ together with the atoms connecting them form one or more aromatic or aliphatic rings, or the radicals $R^e$ and $R^h$ or $R^1$ together with the atoms connecting them form an aromatic or aliphatic ring, $R^m$ is

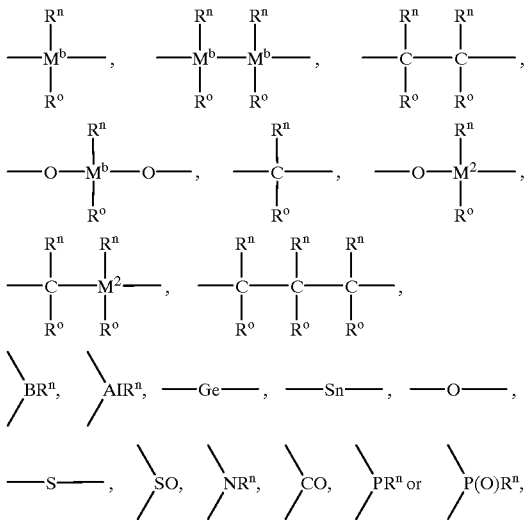

where $R^n$ and $R^o$ are identical or different and are each a hydrogen atom, a halogen atom, a $C_1$–$C_{10}$-alkyl group, a $C_1$–$C_{10}$-fluoroalkyl group, a $C_1$–$C_{10}$-alkoxy group, a $C_6$–$C_{10}$-aryl group, a $C_6$–$C_{10}$-fluoroaryl group, a $C_6$–$C_{10}$-aryloxy group, a $C_2$–$C_{10}$-alkenyl group, a $C_7$–$C_{40}$-arylalkyl group, a $C_7$–$C_{40}$-alkylaryl group or a $C_8$–$C_{40}$-arylalkenyl group, or $R^n$ and $R^o$, in each case together with the atoms connecting them, form one or more rings and $M^b$ is silicon, germanium or tin, and a supported cocatalyst.

An isotactic polypropylene having a melting point below 157° C. is obtained using this catalyst system.

EP 287 666 B1 discloses a process for the polymerization of olefins in the presence of a catalyst comprising a compound of a transition metal, an inorganic support, an aluminoxane and an organoaluminum compound having a hydrocarbon group different from n-alkyl groups as solid catalyst component, wherein the transition metal compound has the formula

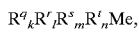

$R^q_k R^r_l R^s_m R^t_n Me$, where $R^q$ is a cycloalkadienyl group, $R^r$, $R^s$ and $R^t$ are identical or different and are each a cycloalkadienyl group, an aryl group, an alkyl group, an arylalkyl group, a halogen atom or a hydrogen atom, Me is zirconium, titanium or hafnium, k is 1, 2, 3 or 4, 1, m and n are 0, 1, 2 or 3 and k+l+m+n=4.

This process gives polymers in good yields.

EP 336 593 B1 discloses a process for preparing a metallocene/aluminoxane catalyst provided with a support for olefin polymerization, in which trialkylaluminum and water are reacted in the presence of a water-absorbing solid material at a molar ratio of trialkylaluminum to water of from 10:1 to 1:1 and a metallocene of a transition metal is added to the reacted mixture, with the water being absorbed by the solid material in an amount of from 10 to 50% by weight prior to the reaction, the water-containing solid material being added to a solution of trialkylaluminum and the molar ratio of aluminum to metallocene transition metal being from 1000:1 to 1:1.

By this process, the cocatalyst is immobilized on the support. An advantageous molar ratio of aluminum to metallocene transition metal is obtained.

DE 4330667 A1 discloses a process for preparing catalyst systems using a pretreated support. In this process, the support material is reacted with a solution of triethylaluminum in heptane. Preference is given to using catalyst systems comprising a mixture of a plurality of metallocene complexes and/or a Ziegler-Natta catalyst system in the polymerization. When using metallocene complexes and Ziegler-Natta catalysts, polypropylenes having a melting point of >160° C. are obtained. Polypropylenes having melting points of <150° C. are prepared when only metallocenes are used as catalysts.

It is an object of the present invention to provide a highly active, supported catalyst system which gives polymers having a high regioregularity and stereoregularity and also an environmentally friendly and economical process for preparing the polymers.

We have found that this object is achieved by a catalyst system comprising at least one metallocene and at least one passivated support.

According to the present invention, the catalyst system is prepared by mixing at least one metallocene and at least one passivated support.

The metallocene component of the catalyst system of the present invention can be essentially any metallocene. The metallocene can be either bridged or unbridged and have identical or different ligands. Preference is given to metallocenes of group IVb of the Periodic Table of the Elements, viz. titanium, zirconium or hafnium, preferably zirconium.

The metallocenes preferably have the formula I

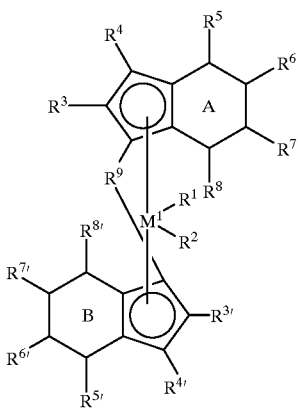

(I)

where
$M^1$ is a metal of group IVb of the Periodic Table of the Elements,
$R^1$ and $R^2$ are identical or different and are each a hydrogen atom, a $C_1$–$C_{10}$-alkyl group, a $C_1$–$C_{10}$-alkoxy group, a $C_6$–$C_{20}$-aryl group, a $C_6$–$C_{20}$-aryloxy group, a $C_2$–$C_{10}$-alkenyl group, an OH group, an $NR^{12}{}_2$ group, where $R^{12}$ is a $C_1$–$C_2$-alkyl group or a $C_6$–$C_{14}$-aryl group, or a halogen atom, $R^3$ to $R^8$ and $R^{3'}$ to $R^{8'}$ are identical or different and are each a hydrogen atom, a $C_1$–$C_{40}$-hydrocarbon group which may be linear, cyclic or branched, e.g. a $C_1$–$C_{10}$-alkyl group, a $C_2$–$C_{10}$-alkenyl group, a $C_6$–$C_{20}$-aryl group, a $C_7$–$C_{40}$-arylalkyl group, a $C_7$–$C_{40}$-alkylaryl group or a $C_8$–$C_{40}$-arylalkenyl group, or adjacent radicals $R^4$ to $R^8$ and/or $R^{4'}$ to $R^{8'}$ together with the atoms connecting them form a ring system, $R^9$ is a bridge, preferably

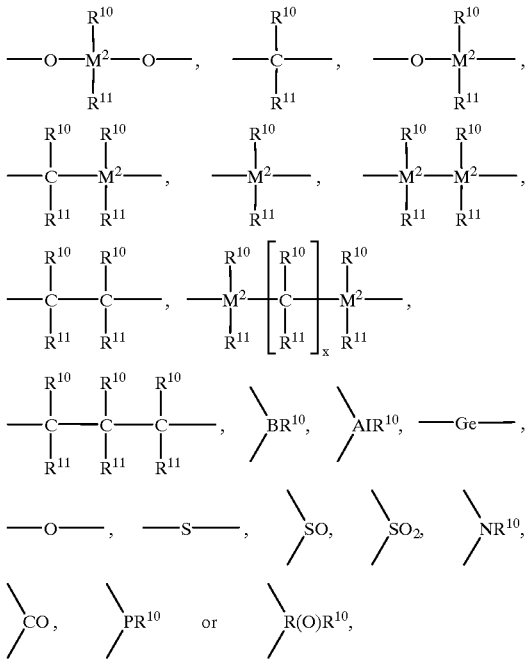

where $R^{10}$ and $R^{11}$ are identical or different and are each a hydrogen atom, a halogen atom or a $C_1$–$C_{40}$-group such as a $C_1$–$C_{20}$-alkyl group, a $C_1$–$C_{10}$-fluoroalkyl group, a $C_1$–$C_{10}$-alkoxy group, a $C_6$–$C_{14}$-aryl group, a $C_6$–$C_{10}$-fluoroaryl group, a $C_6$–$C_{10}$-aryloxy group, a $C_2$–$C_{10}$-alkenyl group, a $C_7$–$C_{40}$-arylalkyl group, a $C_7$–$C_{40}$-alkylaryl group or a $C_8$–$C_{40}$-arylalkenyl group, or $R^{10}$ and $R^{11}$, in each case together with the atoms connecting them, form one or more rings and x is an integer from zero to 18, $M^2$ is silicon, germanium or tin, and the rings A and B are identical or different, saturated or unsaturated. $R^9$ can also link two units of the formula I to one another.

The 4,5,6,7-tetrahydroindenyl analogs corresponding to the compounds I are likewise of importance.

In formula I, it is preferred that
$M^1$ is zirconium,
$R^1$ and $R^2$ are identical and are methyl or chlorine, in particular chlorine, and $R^9=M^2R^{10}R^{11}$, where $M^2$ is silicon or germanium and $R^{10}$ and $R^{11}$ are each a $C_1$–$C_{20}$-hydrocarbon group such as $C_1$–$C_{10}$-alkyl or $C_6$–$C_{14}$-aryl,
$R^5$ and $R^{5'}$ are preferably identical or different and are each a $C_6$–$C_{10}$-aryl group, a $C_7$–$C_{10}$-arylalkyl group, a $C_7$–$C_{40}$-alkylaryl group or a $C_8$–$C_{40}$-arylalkenyl group.

The indenyl or tetrahydroindenyl ligands of the metallocenes of the formula I are preferably substituted in the 2 position, 2,4 positions, 4,7 positions, 2,6 positions, 2,4,6 positions, 2,5,6 positions, 2,4,5,6 positions or 2,4,5,6,7 positions, in particular in the 2,4 positions. Preferred substituents are a $C_1$–$C_4$-alkyl group such as methyl, ethyl or isopropyl or a $C_6$–$C_{10}$-aryl group such as phenyl, naphthyl or mesityl. The 2 position is preferably substituted by a $C_1$–$C_4$-alkyl group such as methyl or ethyl.

Particular preference is given to zirconocenes which bear tetrahydroindenyl derivatives and indenyl derivatives as ligands.

Furthermore, particularly important metallocenes of the formula I are those in which the substituents in the 4 and 5 positions of the indenyl radicals ($R^5$ and $R^6$ or $R^{5'}$ and $R^{6'}$) together with the atoms connecting them form a ring system, preferably a 6-membered ring. This condensed ring system can likewise be substituted by radicals defined as for $R^3$–$R^8$. An example of such a compound I is dimethylsilanediylbis (2-methyl-4,5-benzindenyl)zirconium dichloride.

Very particular preference is given to those compounds of the formula I which bear a $C_6$–$C_{20}$-aryl group in the 4 position and a $C_1$–$C_4$-alkyl group in the 2 position. An example of such a compound of the formula I is dimethylsilanediylbis(2-methyl-4-phenyl-indenyl) zirconium dichloride.

Examples of metallocene components of the catalyst system of the present invention are:
dimethylsilanediylbis(indenyl)zirconium dichloride
dimethylsilanediylbis(4-naphthylindenyl)zirconium dichloride
dimethylsilanediylbis(2-methylbenzindenyl)zirconium dichloride
dimethylsilanediylbis(2-methylindenyl)zirconium dichloride
dimethylsilanediylbis(2-methyl-4-(1-naphthyl)indenyl) zirconium dichloride
dimethylsilanediylbis(2-methyl-4-(2-naphthyl)indenyl) zirconium dichloride
dimethylsilanediylbis(2-methyl-4-phenylindenyl)zirconium dichloride
dimethylsilanediylbis(2-methyl-4-t-butylindenyl)zirconium dichloride
dimethylsilanediylbis(2-methyl-4-isopropylindenyl) zirconium dichloride
dimethylsilanediylbis(2-methyl-4-ethylindenyl)zirconium dichloride
dimethylsilanediylbis(2-methyl-4-α-acenaphthindenyl) zirconium dichloride
dimethylsilanediylbis(2,4-dimethylindenyl)zirconium dichloride
dimethylsilanediylbis(2-ethylindenyl)zirconium dichloride
dimethylsilanediylbis(2-ethyl-4-ethylindenyl)zirconium dichloride
dimethylsilanediylbis(2-ethyl-4-phenylindenyl)zirconium dichloride
dimethylsilanediylbis(2-methyl-4,5-benzindenyl)zirconium dichloride
dimethylsilanediylbis(2-methyl-4,6-diisopropylindenyl) zirconium dichloride
dimethylsilanediylbis(2-methyl-4,5-diisopropylindenyl) zirconium dichloride
dimethylsilanediylbis(2,4,6-trimethylindenyl)zirconium dichloride
dimethylsilanediylbis(2,5,6-trimethylindenyl)zirconium dichloride
dimethylsilanediylbis(2,4,7-trimethylindenyl)zirconium dichloride
dimethylsilanediylbis(2-methyl-5-isobutylindenyl) zirconium dichloride
dimethylsilanediylbis(2-methyl-5-t-butylindenyl)zirconium dichloride
methyl(phenyl)silanediylbis(2-methyl-4-phenylindenyl) zirconium dichloride
methyl(phenyl)silanediylbis(2-methyl-4,6-diisopropylindenyl)-zirconium dichloride
methyl(phenyl)silanediylbis(2-methyl-4-isopropylindenyl) zirconium dichloride
methyl(phenyl)silanediylbis(2-methyl-4,5-benzoindenyl) zirconium dichloride
methyl(phenyl)silanediylbis(2-methyl-4,5-(methylbenzo) indenyl)-zirconium dichloride
methyl(phenyl)silanediylbis(2-methyl-4,5-(tetramethylbenzo)-indenyl)zirconium dichloride
methyl(phenyl)silanediylbis(2-methyl-4-α-acenaphthindenyl)-zirconium dichloride
methyl(phenyl)silanediylbis(2-methylindenyl)zirconium dichloride
methyl(phenyl)silanediylbis(2-methyl-5-isobutylindenyl) zirconium dichloride
1,2-ethanediylbis(2-methyl-4-phenylindenyl)zirconium dichloride
1,4-butanediylbis(2-methyl-4-phenylindenyl)zirconium dichloride
1,2-ethanediylbis(2-methyl-4,6-diisopropylindenyl) zirconium dichloride
1,4-butanediylbis(2-methyl-4-isopropylindenyl)zirconium dichloride
1,4-butanediylbis(2-methyl-4,5-benzindenyl)zirconium dichloride
1,2-ethanediylbis(2-methyl-4,5-benzindenyl)zirconium dichloride
1,2-ethanediylbis(2,4,7-trimethylindenyl)zirconium dichloride
1,2-ethanediylbis(2-methylindenyl)zirconium dichloride
1,4-butanediylbis(2-methylindenyl)zirconium dichloride
bis (butylcyclopentadienyl) $Zr^+CH_2CHCHCH_2B^-(C_6F_5)_3$
bis(methylindenyl)$Zr^+CH_2CHCHCH_2B^-(C_6F_5)_3$
dimethylsilanediylbis (2-methyl-4,5-benzindenyl) $Zr^+CH_2CHCHCH_2B^-(C_6F_5)_3$
1,2-ethanediylbis(2-methylindenyl)$Zr^+CH_2CHCHCH_2B^-$ $(C_6F_5)_3$
1,4-butanediylbis(2-methylindenyl)$Zr^+CH_2CHCHCH_2B^-$ $(C_6F_5)_3$
dimethylsilanediylbis(2-methyl-4,6-diisopropylindenyl)-$Zr^+$ $CH_2CHCHCH_2B^-(C_6F_5)_3$
dimethylsilanediylbis(2-ethyl-4-phenylindenyl)$Zr^+$ $CH_2CHCHCH_2B^-(C_6F_5)_3$
dimethylsilanediylbis(2-methyl-4-phenylindenyl)$Zr^+$ $CH_2CHCHCH_2B^-(C_6F_5)_3$
methyl(phenyl)silanediylbis(2-methyl-4-phenylindenyl)-$Zr^+$ $CH_2CHCHCH_2B^-(C_6F_5)_3$
dimethylsilanediylbis (2-methylindenyl) $Zr^+CH_2CHCHCH_2B^-(C_6F_5)_3$
dimethylsilanediylbis(indenyl)$Zr^+CH_2CHCHCH_2B^-$ $(C_6F_5)_3$
dimethylsilanediyl(tert-butylamido) (tetramethylcyclopentadienyl)-zirconium dichloride
[tris(pentafluorophenyl)(cyclopentadienylidene)borato] (cyclo-pentadienyl)-1,2,3,4-tetraphenylbuta-1,3-dienylzirconium
dimethylsilanediyl[tris(pentafluorophenyl)(2-methyl-4-phenyl-indenylidene)borato](2-methyl-4-phenylindenyl)-1,2,3,4-tetra-phenylbuta-1,3-dienylzirconium
dimethylsilanediyl[tris(trifluoromethyl)(2-methylbenzindenyl-idene)borato](2-methylbenzindenyl)-1,2,3,4-tetraphenylbuta-1,3-dienylzirconium
dimethylsilanediyl[tris(pentafluorophenyl)(2-methylindenylidene)-borato](2-methylindenyl)-1,2,3,4-tetraphenylbuta-1,3-dienyl-zirconium
dimethylsilanediylbis(indenyl)dimethylzirconium dimethylsilanediylbis(4-naphthylindenyl)dimethylzirconium
dimethylsilanediylbis(2-methylbenzoindenyl)dimethylzirconium
dimethylsilanediylbis(2-methylindenyl)dimethylzirconium
dimethylsilanediylbis(2-methyl-4-(2-naphthyl)indenyl)dimethyl-zirconium
dimethylsilanediylbis(2-methyl-4-(2-naphthyl)indenyl)dimethyl-zirconium
dimethylsilanediylbis(2-methyl-4-phenylindenyl)dimethylzirconium
dimethylsilanediylbis(2-methyl-4-t-butylindenyl)dimethylzirconium
dimethylsilanediylbis(2-methyl-4-isopropylindenyl)dimethyl-zirconium
dimethylsilanediylbis(2-methyl-4-ethylindenyl)dimethylzirconium
dimethylsilanediylbis(2-methyl-4-α-acenaphthindenyl)dimethyl-zirconium
dimethylsilanediylbis(2,4-dimethylindenyl)dimethylzirconium
dimethylsilanediylbis(2-ethylindenyl)dimethylzirconium
dimethylsilanediylbis(2-ethyl-4-ethylindenyl)dimethylzirconium
dimethylsilanediylbis(2-ethyl-4-phenylindenyl)dimethylzirconium
dimethylsilanediylbis(2-methyl-4,5-benzindenyl)dimethylzirconium
dimethylsilanediylbis(2-methyl-4,6-diisopropylindenyl)dimethyl-zirconium
dimethylsilanediylbis(2-methyl-4,5-diisopropylindenyl)dimethyl-zirconium
dimethylsilanediylbis(2,4,6-trimethylindenyl)dimethylzirconium
dimethylsilanediylbis(2,5,6-trimethylindenyl)dimethylzirconium
dimethylsilanediylbis(2,4,7-trimethylindenyl)dimethylzirconium
dimethylsilanediylbis(2-methyl-5-isobutylindenyl)dimethyl-zirconium
dimethylsilanediylbis(2-methyl-5-t-butylindenyl)dimethylzirconium
methyl(phenyl)silanediylbis(2-methyl-4-phenylindenyl)dimethyl-zirconium
methyl(phenyl)silanediylbis(2-methyl-4,6-diisopropylindenyl)-dimethylzirconium
methyl(phenyl)silanediylbis(2-methyl-4-isopropylindenyl)dimethyl-zirconium
methyl(phenyl)silanediylbis(2-methyl-4,5-benzindenyl)dimethyl-zirconium
methyl(phenyl)silanediylbis(2-methyl-4,5-(methylbenzo)indenyl)-dimethylzirconium
methyl(phenyl)silanediylbis(2-methyl-4,5-(tetramethylbenzo)-indenyl)dimethylzirconium
methyl(phenyl)silanediylbis(2-methyl-4-α-acenaphthindenyl)-dimethylzirconium
methyl(phenyl)silanediylbis(2-methylindenyl)dimethylzirconium
methyl(phenyl)silanediylbis(2-methyl-5-isobutylindenyl)methyl-zirconium
1,2-ethanediylbis(2-methyl-4-phenylindenyl)dimethylzirconium
1,4-butanediylbis(2-methyl-4-phenylindenyl)dimethylzirconium
1,2-ethanediylbis(2-methyl-4,6-diisopropylinidenyl)dimethyl-zirconium
1,4-butanediylbis(2-methyl-4-isopropylindenyl)dimethylzirconium
1,4-butanediylbis(2-methyl-4,5-benzindenyl)dimethylzirconium
1,2-ethanediylbis(2-methyl-4,5-benzindenyl)dimethylzirconium
1,2-ethanediylbis(2,4,7-trimethylindenyl)dimethylzirconium
1,2-ethanediylbis(2-methylindenyl)dimethylzirconium
1,4-butanediylbis(2-methylindenyl)dimethylzirconium Particular preference is given to:
dimethylsilanediylbis(2-methylindenyl)zirconium dichloride
dimethylsilanediylbis(2-methyl-4-(1-naphthyl)indenyl)zirconium dichloride
dimethylsilanediylbis(2-methyl-4-phenylindenyl)zirconium dichloride
dimethylsilanediylbis(2-methyl-4-α-acenaphthindenyl)zirconium dichloride
dimethylsilanediylbis(2-ethyl-4-phenylindenyl)zirconium dichloride
dimethylsilanediylbis(2-methyl-4,5-benzindenyl)zirconium dichloride
dimethylsilanediylbis(2-methyl-4,6-diisopropylindenyl)zirconium dichloride.

Methods of preparing metallocenes of the formula I are described, for example, in Journal of Organometallic Chem. 288 (1985) 63–67 and the documents cited therein.

The catalyst system of the present invention preferably further comprises at least one cocatalyst.

The cocatalyst component which, according to the present invention, may be present in the catalyst system comprises at least one compound of the aluminoxane, Lewis acid or ionic type which reacts with a metallocene to convert the latter into a cationic compound.

As aluminoxane, preference is given to using a compound of the formula II $$(R\ AlO)_n \tag{II}$$

Aluminoxanes can be, for example, cyclic as in formula III

or linear as in formula IV

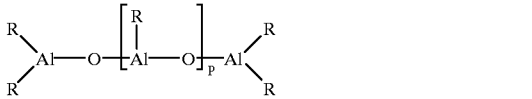

or of the cluster type as in formula V, as is described in recent literature; cf. JACS 117 (1995), 6465–74, Organometallics 13 (1994), 2957–2969.

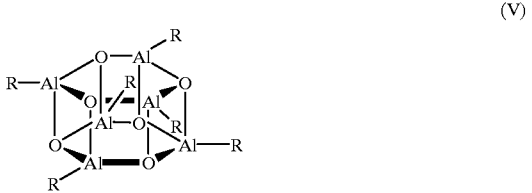

The radicals R in the formulae (II), (III), (IV) and (V) can be identical or different and can each be a $C_1$–$C_{20}$-hydrocarbon group such as a $C_1$–$C_6$-alkyl group, a $C_6$–$C_{18}$- aryl group, benzyl or hydrogen, and p can be an integer from 2 to 50, preferably from 10 to 35.

Preferably, the radicals R are identical and are methyl, isobutyl, n-butyl, phenyl or benzyl, particularly preferably methyl.

If the radicals R are different, they are preferably methyl and hydrogen, methyl and isobutyl or methyl and n-butyl, with hydrogen and isobutyl or n-butyl preferably being present in an amount of 0.01–40% (number of radicals R).

The aluminoxane can be prepared in various ways by known methods. One of the methods is, for example, reacting an aluminum-hydrocarbon compound and/or a hydridoaluminum-hydrocarbon compound with water (gaseous, solid, liquid or bound, for example as water of crystallization) in an inert solvent (such as toluene). To prepare an aluminoxane having different alkyl groups R, two different trialkylaluminums ($AlR_3+AlR'_3$) corresponding to the desired composition and reactivity are reacted with water (cf. S. Pasynkiewicz, Polyhedron 9 (1990) 429 and EP-A 302 424).

Regardless of the method of preparation, all aluminoxane solutions have in common a varying content of unreacted aluminum starting compound which is present in free form or as adduct.

As Lewis acid, preference is given to using at least one organoboron or organoaluminum compound comprising $C_1$–$C_{20}$- groups such as branched or unbranched alkyl or haloalkyl, e.g. methyl, propyl, isopropyl, isobutyl or trifluoromethyl, or unsaturated groups such as aryl or haloaryl, e.g. phenyl, tolyl, benzyl groups, p-fluorophenyl, 3,5-difluorophenyl, pentachlorophenyl, penta- fluorophenyl, 3,4,5-trifluorophenyl and 3,5-di(trifluoromethyl)-phenyl.

Particular preference is given to organoboron compounds. Examples of Lewis acids are trifluoroborane, triphenylborane, tris-(4-fluorophenyl)borane, tris(3,5-difluorophenyl)borane, tris(4-fluoromethylphenyl)borane, tris(pentafluorophenyl)borane, tris(tolyl)borane, tris(3,5-dimethylphenyl)borane, tris(3,5-difluorophenyl)borane and/or tris(3,4,5-trifluorophenyl)borane. Very particular preference is given to tris(pentafluorophenyl)-borane.

As ionic cocatalysts, preference is given to using compounds which contain a noncoordinating anion such as tetrakis(penta-fluorophenyl)borates, tetraphenylborates, $SbF_6^\ominus$, $CF_3SO_3^\ominus$ or $ClO_4^\ominus$. As cationic counterion, use is made of Lewis bases such as metyhlamine [sic], aniline, dimethylamine, diethylamine, N-methylaniline, diphenylamine, N,N-dimethylaniline, trimethylamine, triethylamine, tri-n-butylamine, methyldiphenylamine, pyridine, p-bromo-N,N-dimethylaniline, p-nitro-N,N-dimethylaniline, triethylphosphine, triphenylphosphine, diphenylphosphine, tetrahydrothiophene and triphenylcarbenium.

Examples of such ionic compounds according to the present invention are
triethylammonium tetra(phenyl)borate,
tributylammonium tetra(phenyl)borate,
trimethylammonium tetra(tolyl)borate,
tributylammonium tetra(tolyl)borate,
tributylammonium tetra(pentafluorophenyl)borate,
tributylammonium tetra(pentafluorophenyl)aluminate,
tripropylammonium tetra(dimethylphenyl)borate,
tributylammonium tetra(trifluoromethylphenyl)borate,
tributylammonium tetra(4-fluorophenyl)borate,
N,N-dimethylanilinium tetra(phenyl)borate,
N,N-diethylanilinium tetra(phenyl)borate,
N,N-dimethylanilinium tetrakis(pentafluorophenyl)borate,
N,N-dimethylanilinium tetrakis(pentafluorophenyl) aluminate,
di(propyl)ammonium tetrakis(pentafluorophenyl)borate,
di(cyclohexyl)ammonium tetrakis(pentafluorophenyl) borate,
triphenylphosphonium tetrakis(phenyl)borate,
triethylphosphonium tetrakis(phenyl)borate,
diphenylphosphonium tetrakis(phenyl)borate,
tri(methylphenyl)phosphonium tetrakis(phenyl)borate,
tri(dimethylphenyl)phosphonium tetrakis(phenyl)borate,
triphenylcarbenium tetrakis(pentafluorophenyl)borate,
triphenylcarbenium tetrakis(pentafluorophenyl)aluminate,
triphenylcarbenium tetrakis(phenyl)aluminate,
ferrocenium tetrakis(pentafluorophenyl)borate and/or
ferrocenium tetrakis(pentafluorophenyl)aluminate.

Preference is given to triphenylcarbenium tetrakis(pentafluorophenyl)borate and/or N,N-dimethylanilinium tetrakis-(pentafluorophenyl)borate.

It is also possible to use mixtures of at least one Lewis acid and at least one ionic compound.

Cocatalyst components which are likewise of importance are borane or carborane compounds such as 7,8-dicarbaundecaborane(13),
undecahydrido-7,8-dimethyl-7,8-dicarbaundecaborane,
dodecahydrido-1-phenyl-1,3-dicarbanonaborane,
tri(butyl)ammonium undecahydrido-8-ethyl-7,9-dicarbaundecaborate,
4-carbanonaborane(14)bis(tri(butyl)ammonium) nonaborate,
bis(tri(butyl)ammonium) undecaborate,
bis(tri(butyl)ammonium) dodecaborate,
bis(tri(butyl)ammonium) decachlorodecaborate,
tri(butyl)ammonium 1-carbadecaborates,
tri(butyl)ammonium 1-carbadodecaborates,
tri(butyl)ammonium 1-trimethylsilyl-1-carbadecaborates,
tri(butyl)ammonium bis(nonahydrido-1,3-dicarbanonaborato)-cobaltates(III),
tri(butyl)ammonium bis(undecahydrido-7,8-dicarbaundecaborato)-ferrate(III).

The support components of the catalyst system of the present invention is a passivated support, preferably at least one inorganic oxide such as silicon oxide, aluminum oxide, zeolites, MgO, $ZrO_2$, $TiO_2$, $B_2O_3$, CaO, ZnO, $ThO_2$, $Na_2CO_3$, $K_2CO_3$, $CaCO_3$, $MgCO_3$, $Na_2SO_4$, $Al_2(SO_4)_3$, $BaSO_4$, $KNO_3$, $Mg(NO_3)_2$, $Al(NO_3)_3$, $Na_2O$, $K_2O$, $Li_2O$ in particular silicon oxide and/or aluminum oxide. The support thus has a specific surface area in the range from 10 to 1000 $m^2/g$, preferably from 150 to 500 $m^2/g$, particularly preferably from 200 to 400 $m^2/g$. The mean particle size of the support is from 1 to 500 $\mu m$, preferably from 5 to 350 $\mu m$, particularly preferably from 10 to 200 $\mu m$. The pore volume of the support is from 0.5 to 4.0 ml/g, preferably from 1.0 to 3.5 ml/g, very particularly preferably from 1.2 to 3 ml/g. This support component is passivated using at least one organometallic, preferably organoaluminum, compound. The porous structure of the support results in a proportion of voids (pore volume) in the support particle, the support material or the shaped support body.

The shape of the pores is irregular, frequently spherical. Some of the pores are connected to one another by means of small pore openings. The pore diameter is from about 2 to 50 nm.

The particle shape of the porous support is dependent on the aftertreatment and can be irregular or spherical. The support particle sizes can be set to any desired value by, for example, cryogenic milling and/or sieving.

The passivated support of the present invention comprises a product derived from one or more inorganic oxides, preferably silicon oxide and/or aluminum oxide, and an organometallic, preferably organoaluminum, compound.

The present invention also provides for the support material to be heated to <800° C. or for its surface to be silanized or esterified. The support of the present invention is dried at from 100° C. to 800° C. at from 0.01 bar to 0.001 bar or at from 100° C. to 800° C. in an inert gas stream for 5–15 hours in order to remove physisorbed water. The dried support material contains <1.5% by weight of water and from 0.1 to 6% by weight of silanol groups. The water content is determined by the weight loss after drying at 200° C. for 4 hours. The proportion of silanol groups on the surface can be determined by DTA (differential thermal analysis) or according to the following formula: % by weight=[($SiO_2$ dried at 200° C., 4 h)–($SiO_2$ dried at 1000° C., 20 h)]/($SiO_2$ dried at 200° C., 4 h)·100.

The support material dried in this way is reacted with at least one organometallic compound. The organometallic compound is preferably an organoaluminum compound. Particular preference is given to organoaluminum compounds containing linear, cyclic or branched, saturated or unsaturated $C_1$–$C_9$ carbon-containing groups, e.g. trimethylaluminum, triethylaluminum, triisobutylaluminum, methylaluminoxane, tripropylaluminum, tri-n-butylaluminum, tri-sec-butylaluminum, isobutylaluminoxane, trihexylaluminum, tridodecylaluminum, triphenylaluminum, butylaluminoxane, tri(cyclohexyl)aluminum, dimethylaluminum methoxide, diethylaluminum ethoxide, diisobutylaluminum methoxide, diethylaluminum trimethylsilyloxide, lithium butyldiisobutylaluminum, lithium tri-tert-butoxyaluminum, lithium tert-butyldiisobutylaluminum and/or diisobutylaluminum trimethylsilyloxide. Also suitable are organomagnesium or organoboron compounds such as diethylmagnesium, diisopropylmagnesium, dipropylmagnesium, dibutylmagnesium,dioctylmagnesium, dihexylmagnesium, didodecylmagnesium, dicyclohexylmagnesium, dibenzylmagnesium, ditolylmagnesium, dixylylmagnesium, ethylmagnesium ethoxide, octylmagnesium ethoxide, octylmagnesium octoxide, ethylpropylmagnesium, ethylbutylmagnesium, amylhexylmagnesium, n-butyl-sec-butylmagnesium, butyloctylmagnesium, triethylborane, triisobutylborane, tripropylborane, tri-n-butylborane, tri-sec-butylborane, trihexylborane, triphenylborane, tri(cyclohexyl)borane, dimethylmethoxyborane, diisobutylmethoxyborane, diethyltrimethylsilyloxyborane, lithium butyldiisobutylborane, lithium tri-tert-butoxyborane, lithium tert-butyldiisobutylborane, 2-biphenylboronic acid, tris(trimethylsilylmethyl)borane and/or phenylboronic acid.

Very particular preference is given to using trimethylaluminum, tributylaluminum, triethylborane and/or tributylborane, but not triethylaluminum.

The passivation of the support is carried out by suspending the support material in a suitable solvent such as pentane, hexane, heptane, toluene or dichloromethane and slowly adding a solution of the organoaluminum compound, e.g. an aluminum alkyl solution, dropwise to this suspension and stirring to react the components, or slowly adding a solution of the organoaluminum compound, e.g. an aluminum alkyl solution, dropwise to the dry support material while stirring and only then preparing a suspension using a suitable solvent.

The reaction temperature is preferably from –20 to +150° C., in particular 15–40° C. The reaction time is from 1 to 120 minutes, preferably 10–30 minutes. An aluminum concentration of greater than 0.01 mol/liter, in particular greater than 0.5 mol/liter, is preferably employed. Preference is given to using from 0.01 to 0.1 mol of aluminum compound per g of support material. The reaction is carried out under inert conditions.

The support is then separated from the solvent. The residue is washed twice with a suitable solvent such as pentane, hexane, heptane, toluene or dichloromethane and, if desired, dried in an oil pump vacuum at from 20 to 40° C. and 0.01 to 0.001 bar. This gives a passivated support according to the present invention whose proportion of hydroxyl groups on the support surface has been reduced by the above-described treatment. The proportion of silanol groups on a passivated silica surface has dropped, for example, to <2% by weight, preferably <1.5% by weight.

For the purposes of the present invention, the expression "passivated support" means a support which has been treated as described above.

To prepare the catalyst system of the present invention, the passivated support component is reacted with at least one metallocene component and preferably with at least one cocatalyst component. The order in which the components are reacted is of no consequence. The reaction is carried out in a suitable solvent such as pentane, heptane, toluene, dichloromethane or dichlorobenzene in which the passivated support component is suspended and a solution of the metallocene and cocatalyst components is added dropwise, preferably by adding a solution of the metallocene and cocatalyst components in such an amount that the total solution volume is from 110 to 370% of the pore volume of the support component. The preparation of the catalyst system of the present invention is carried out at from –20 to 150° C., preferably from 20 to 50° C., and a contact time of from 15 minutes to 25 hours, preferably from 15 minutes to 5 hours.

The resulting catalyst system of the present invention has a metallocene content, preferably zirconium content, of from 0.001 to 2 mmol of $Zr/g_{support}$, preferably from 0.01 to 0.5 mmol of $zr/g_{support}$, particularly preferably from 0.01 to 0.1 mmol of $Zr/g_{support}$, and an aluminum content of from 0.001 to 0.1 mol of $Al/g_{support}$, preferably from 1 to 50 mmol of $Al/g_{support}$. The aluminum/zirconium ratio is from 50:1 to 1000:1 (Al:Zr), preferably from 400:1 to 700:1 (Al:Zr).

The catalyst system of the present invention gives polymers such as polypropylene having extraordinarily high stereospecificity and regiospecificity.

Particularly characteristic for the stereospecificity and regiospecificity of polymers, in particular polypropylene, is, for example, the triad tacticity (TT) and the proportion of 2-1-inserted propene units (RI), which can be determined from the $^{13}$C-NMR spectra.

The $^{13}$C-NMR spectra are measured in a mixture of hexachlorobutadiene and $d_2$-tetrachloroethane at elevated temperature (365 K). All $^{13}$C-NMR spectra of the polypropylene samples measured are calibrated to the resonance signal of $d_2$-tetrachloroethane ($\delta$=73.81 ppm).

The triad tacticity of the polypropylene is determined from the methyl resonance signals in the $^{13}$C-NMR spectrum between 23 and 16 ppm; cf. J. C. Randall, Polymer Sequence Determination: Carbon-13 NMR Method, Academic Press New York 1978; A. Zambelli, P. Locatelli, G. Bajo, F. A. Bovey, Macromolecules 8 (1975), 687–689; H. N. Cheng, J. A. Ewen, Makromol. Chem. 190(1989), 1931–1943. Three successive 1-2-inserted propene units whose methyl groups are arranged on the same side in the "Fischer projection" are referred to as mm triads ($\delta$=21.0 ppm to 22.0 ppm). If only the second methyl group of the three successive propene units points to the other side, the sequence is referred to as an rr triad ($\delta$=19.5 ppm to 20.3 ppm) and if only the third methyl group of the three successive propene units points to the other side, the sequence is referred to as an mr triad (δ=20.3 ppm to 21.0 ppm). The triad tacticity is calculated according to the following formula:

TT (%)=mm/(mm+mr+rr)·100

If a propene unit is inserted in reverse into the growing polymer chain, this is referred to as a 2-1 insertion; cf. T. Tsutsui, N. Ishimaru, A. Mizuno, A. Toyota, N. Kashiwa, Polymer 30, (1989), 1350–56. The following different structural arrangements are possible:

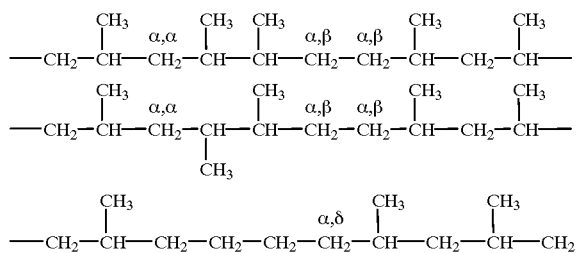

The proportion of 2-1-inserted propene units (RI) can be calculated according to the following formula:

RI(%)=0.5 Iα,β(Iα,α+Iα,β+Iα,δ)·100, where

Iα,α is the sum of the intensities of the resonance signals at δ=41.84, 42.92 and 46.22 ppm, Iα,β is the sum of the intensities of the resonance signals at δ=30.13, 32.12, 35.11 and 35.57 ppm and Iα,δ is the intensity of the resonance signal at δ=37.08 ppm.

A particularly high regiospecificity also gives a particularly high melting point of the polymer, in particular the isotactic polypropylene. The isotactic polypropylene which has been prepared using the catalyst system of the present invention has a proportion of 2-1-inserted propene units RI<0.2%, preferably <0.1%, at a triad tacticity TT>98.0% and a melting point >158° C., preferably >160° C., and the $M_w/M_n$ of the polypropylene prepared according to the present invention is from 2.5 to 3.5.

The present invention also provides a process for preparing a polyolefin by polymerization of one or more olefins in the presence of the catalyst system of the present invention comprising at least one passivated support. For the purposes of the present invention, the term polymerization means homopolymerization or copolymerization.

Preference is given to polymerizing olefins of the formula R"—CH=CH—R$^v$, where R" and R$^v$ are identical or different and are each a hydrogen atom or a carbon-containing radical having from 1 to 20 carbon atoms, in particular from 1 to 10 carbon atoms, and R" and R$^v$ together with the atoms connecting them can form one or more rings. Examples of such olefins are 1-olefins having from 2 to 40, preferably from 2 to 10, carbon atoms, e.g. ethylene, propene, 1-butene, 1-pentene, 1-hexene, 4-methyl-1-pentene or 1-octene, styrene, dienes such as 1,3-butadiene, 1,4-hexadiene, vinylnorbornene or norbornadiene and cyclic olefins such as norbornene, tetracyclododecene or methylnorbornene. In the process of the present invention, preference is given to homopolymerizing ethene or propene or copolymerizing ethene with one or more 1-olefins having from 3 to 20 carbon atoms, e.g. propene, and/or one or more dienes having from 4 to 20 carbon atoms, e.g. 1,4-butadiene or norbornadiene. Examples of such copolymers are ethene-propene copolymers and ethene-propene-1,4-hexadiene copolymers.

The polymerization is preferably carried out at from −60 to 250° C., particularly preferably from 50 to 200° C. The pressure is preferably from 0.5 to 2000 bar, particularly preferably from 5 to 64 bar.

The polymerization time is from 10 minutes to 10 hours, preferably from 30 minutes to 120 minutes.

The polymerization can be carried out in solution, in bulk, in suspension or in the gas phase, continuously or batchwise, in one or more stages.

The catalyst system used in the process of the present invention preferably comprises one transition metal compound of the metallocene component. It is also possible to use mixtures of two or more transition metal compounds of the metallocene component, e.g. for preparing polyolefins having a broad or multimodal molar mass distribution and reactor blends.

A prepolymerization can be carried out by means of the catalyst system of the present invention. The prepolymerization is preferably carried out using the (or one of the) olefin(s) used in the polymerization.

The supported catalyst system can be resuspended in an inert suspension medium either as powder or while still moist with solvent. The suspension can be introduced into the polymerization system.

Before addition of the supported catalyst system of the present invention to the polymerization system, it is advantageous to purify the olefin using an aluminum alkyl compound such as trimethylaluminum, triethylaluminum, triisobutylaluminum, trioctylaluminum, isoprenylaluminum or aluminoxanes to make the polymerization system inert (for example to remove catalyst poisons present in the olefin). This purification can be carried out either in the polymerization system itself or the olefin is brought into contact with the Al compound and subsequently separated off again before addition to the polymerization system. If this purification is carried out in the polymerization system itself, the aluminum alkyl compound is added to the polymerizaiton system in a concentration of from 0.01 to 100 mmol of Al per kg of reactor contents. Preference is given to using triisobutylaluminum and triethylaluminum in a concentration of from 0.1 to 10 mmol of Al per kg of reactor contents.

If necessary, hydrogen is added as molar mass regulator and/or to increase the activity. The total pressure in the polymerization system is from 0.5 to 2500 bar, preferably from 2 to 1500 bar.

The catalyst system is employed in a concentration, based on the transition metal, of preferably from $10^{-3}$ to $10^{-8}$ mol, particularly preferably from $10^{-4}$ to $10^{-7}$ mol, of transition metal per $dm^3$ of solvent or per $dm^3$ of reactor volume.

If the polymerization is carried out as a suspension or solution polymerization, an inert solvent customary for the Ziegler low-pressure process is used. For example, the polymerization is carried out in an aliphatic or cycloaliphatic hydrocarbon, for example propane, butane, hexane, heptane, isooctane, cyclohexane or methylcyclohexane. It is also possible to use a petroleum or hydrogenated diesel oil fraction. Toluene can also be used. Preference is given to carrying out the polymerization in the liquid monomer.

If inert solvents are used, the monomers are metered in in gaseous or liquid form.

The duration of the polymerization can be as desired, since the catalyst system to be used according to the present invention displays only a slight time-dependent drop in the polymerization activity.

The polymers prepared by the process of the present invention are particularly suitable for producing shaped bodies such as films, sheets or large hollow bodies (e.g. pipes).

When using the catalyst system of the present invention, a catalyst activity of from 170 to 250 kg of PP/g of metallocene x h is achieved. The polymers of the present invention have melting points of from 158 to 165° C. The polymers of the present invention have triad tacticities of from 98.0 to 99.5% and reverse insertions of from 0.05 to 0.12%.

The invention is illustrated by a drawing and examples.

The drawing consists of FIG. 1 and FIG. 2.

FIG. 1 shows extracts from a $^{13}$C-NMR spectrum (from 23 to 13 ppm and from 47 to 27 ppm) of a polypropylene which has been prepared using the novel, supported catalyst as described in Example 12.

FIG. 2 shows extracts from a $^{13}$C-NMR spectrum (from 23 to 13 ppm and from 47 to 27 ppm) of a polypropylene which has been prepared using the supported catalyst "MAO on $SiO_2$" similar to that in EP 576 970 A1 as described in Comparative Example 4.

The measurement of the $^{13}$C-NMR spectra was carried out in a mixture of $C_4Cl_6$ and $C_2D_2Cl_4$ at 365 K and 100.6 MHz on a Brucker AM 400.

Table 1 shows the evaluation of relevant resonance signals of the $^{13}$C-NMR spectra.

TABLE 1

| | | Peaks | | | | | | | | |
|---|---|---|---|---|---|---|---|---|---|---|
| Sample 1 | ppm | 16.89 | 17.12 | 19.10 | 20.7 | 21.47 | 29.91 | 35.35 | 41.62 | 45.88 |
| (FIG. 1) | Integral | 0.215 | 0.215 | 0.05 | 1.00 | 68.61 | 0.05 | 0.04 | 0.03 | 68.83 |
| Sample 2 | ppm | 16.89 | 17.13 | 19.10 | 20.70 | 21.48 | 29.91 | 35.37 | 41.3 | 45.88 |
| (FIG. 2) | Integral | 0.395 | 0.395 | 1.00 | 2.66 | 64.80 | 0.30 | 0.31 | 0.43 | 70.33 |

Comparison of the NMR spectra of Samples 1 and 2 shows that Sample 1 has a significantly lower proportion of 2-1-inserted propene units (RI=0.06%) than Sample 2 (RI=0.43%). This is evidence of the lower proportion of reverse insertions in Sample 1 compared to Sample 2.

EXAMPLES

General procedures: The preparation and handling of the organometallic compounds was carried out with exclusion of air and moisture under argon (Schlenk technique). All solvents required were dried before use by boiling for a number of hours over a suitable desiccant and subsequent distillation under argon. The spherical, porous support materials used were silicas such as MS grades from PQ Corporation, ES or EP grades from Crosfield, or silica grades 948, 952, 955 from Grace Davisson or the like.

The compounds were characterized using $^1$H-HMR [sic], $^{13}$C-NMR and IR spectroscopy.

Example 1

Passivation of the Support Material 40 ml of 20% strength trimethylaluminum solution in Varsol were slowly added dropwise while stirring to 10 g of $SiO_2$ (ES 70, Crosfield Catalysts, dried at 140° C. and 10 mbar). Sufficient toluene to form a readily stirrable suspension was then added. The mixture was stirred for another 10 minutes and the solid was then filtered off from the solvent. The filtration residue was washed twice with 10 ml of toluene. The support material which had been pretreated in this way was dried at 40° C. in an oil pump vacuum.

Preparation of the Supported Catalyst System

In parallel thereto, 4.5 mg (7.2 μmol) of dimethylsilanediyl-bis(2-methyl-4-phenylindenyl) zirconium dichloride were mixed with 10 cm$^3$ of 30% strength (48.1 mmol) methylaluminoxane solution in toluene and an additional 1.5 cm$^3$ of toluene and the mixture was stirred for 15 minutes.

1 g of the passivated support material was resuspended in toluene and added dropwise to the above metallocene/methylaluminoxane solution. The reaction mixture was stirred for 30 minutes at room temperature. The mixture was subsequently filtered and the solid was washed 3 times with 10 cm$^3$ of hexane. The hexane-moist filtration residue which remained was resuspended in 20 cm$^3$ of hexane for the polymerization.

Polymerization

In parallel thereto, a dry 16 dm$^3$ reactor was flushed first with nitrogen and subsequently with propylene and charged with 10 dm$^3$ of liquid propylene. 3 cm$^3$ of triisobutylaluminum (pure, 12 mmol) diluted with 30 cm$^3$ of hexane were then introduced into the reactor and the mixture was stirred at 30° C. for 15 minutes. The catalyst suspension was subsequently introduced into the reactor. The reaction mixture was heated to the polymerization temperature of 50° C. (4° C./min) and the polymerization system was held at 50° C. for 1 hour by cooling. The polymerization was stopped by addition of 20 cm$^3$ of isopropanol. The excess monomer was vented, the polymer was dried under reduced pressure.

This gave 1.01 kg of polypropylene powder. The reactor displayed no deposits on the inner wall or stirrer. The catalyst activity was 242 kg of PP/g of metallocene×h.

VN=793 cm$^3$/g; m.p.=160° C.; $M_w$=1,155,000; $M_w/M_n$=3.2;

BD=356 d/dm$^3$ [sic].

Example 2

The synthesis of the supported catalyst system of Example 1 was repeated, except that 5 cm$^3$ of 30% strength (24 mmol) methyl-aluminoxane solution in toluene, 1.8 mg of dimethylsilanediyl-bis(2-methyl-4-phenylindenyl) zirconium dichloride (2.9 μmol of Zr) and 3 g of passivated support material were used. The polymerization was carried out using a method similar to Example 1 at 70° C. This gave 480 g of polypropylene powder. The reactor displayed no deposits on the inner wall or stirrer.

The catalyst activity was 267 kg of PP/g of metallocene× h.

VN=811 cm$^3$/g; m.p.=161° C.; $M_w$=1,182,000 g/mol; $M_w/M_n$=3.2;

BD=343 g/dm$^3$.

Example 3

The synthesis of the supported catalyst system of Example 1 was repeated, except that 70 cm³ of 30% strength (337 mmol) methylaluminoxane solution in toluene, 2.5 g of passivated support material and 44.2 mg of dimethylsilanediylbis(2-methyl-4-phenylindenyl)zirconium dichloride (70.3 μmol of Zr) were used and the reaction mixture was stirred for 60 minutes at room temperature. The solid was subsequently filtered off and washed 3 times with 50 cm³ of hexane.

The hexane-moist filtration residue which remained was dried under reduced pressure to give a free-flowing, pale pink powder. This gave 5.36 g of supported, dry catalyst. For the polymerization, 2 g of this dry catalyst (16.5 mg=26.2 μmol of Zr) were resuspended in 20 cm³ of hexane. The polymerization was carried out using a method similar to Example 1 at 70° C.

This gave 3.93 kg of polypropylene powder. The reactor displayed no deposits on the inner wall or stirrer. The catalyst activity was 238 kg of PP/g of metallocene×h. VN=824 cm³/g; m.p.=160° C.; $M_w$=1,194,000 g/mol; $M_w/M_n$=3.0; BD=377 g/dm³.

Example 4

Passivation of the Support Material 40 ml of 20% strength triisobutylalumnum solution in Varsol were slowly added dropwise while stirring to 10 g of $SiO_2$ (ES 70, Crosfield Catalysts, dried at 140° C. and 10 mbar). Sufficient toluene to form a readily stirrable suspension was then added. The mixture was stirred for another 10 minutes and the solid was then filtered off from the solvent. The filtration residue was washed twice with 10 ml of toluene. The support material which had been pretreated in this way was dried in an oil pump vacuum.

Preparation of the supported catalyst system

In parallel thereto, 4.5 mg of dimethylsilanediylbis(2-methyl-4-phenylindenyl)zirconium dichloride (7.2 μmol) were mixed with 1 cm³ of 30% strength (4.81 mmol) methylaluminoxane solution in toluene and an additional 2 cm³ of toluene and the mixture was stirred for 15 minutes. This metallocene/methylaluminoxane solution in toluene was then added dropwise to 1 g of passivated support material resuspended in toluene. The reaction mixture was stirred for 30 minutes at room temperature. The mixture was subsequently filtered and the solid was washed 3 times with 10 cm³ of hexane. The hexane-moist filtration residue which remained was resuspended in 20 cm³ of hexane for the polymerization.

Polymerization

In parallel thereto, a dry 16 dm³ reactor was flushed first with nitrogen and subsequently with propylene and charged with 10 dm³ of liquid propylene. 3 cm³ of triisobutylaluminum (pure, 12 mmol) were then diluted with 30 cm³ of hexane, introduced into the reactor and the mixture was stirred at 30° C. for 15 minutes. The catalyst suspension was subsequently introduced into the reactor, the mixture was heated to the polymerization temperature of 50° C. (4° C./min) and the polymerization system was held at 50° C. for 1 hour by cooling. The polymerization was stopped by addition of 20 cm³ of isopropanol. The excess monomer was vented, the polymer was dried under reduced pressure.

This gave 895 g of polypropylene powder. The reactor displayed no deposits on the inner wall or stirrer. The catalyst activity was 199 kg of PP/g of metallocene×h.

VN=812 cm³/g; m.p.=161° C.; $M_w$=1,188,000 g/mol; $M_w/M_n$=3.3;

BD=380 g/dm³.

Example 5

The synthesis of the supported catalyst system of Example 4 was repeated, except that 10 cm³ of 30% strength methylaluminoxane solution in toluene (48.1 mmol), 44.2 mg of dimethylsilane-diylbis(2-methyl-4-phenylindenyl)zirconium dichloride (70.3 g [sic] μmol of Zr) and 5 g of passivated support material were used and the reaction mixture was stirred for 60 minutes at room temperature. The solid was subsequently filtered off and washed 3 times with 50 cm³ of hexane. The hexane-moist filtration residue which remained was dried under reduced pressure to give a free-flowing, pale pink powder. This gave 5.4 g of supported, dry catalyst.

For the polymerization, 2 g of this dry catalyst (16.5 mg=26.2 μmol of Zr) were resuspended in 20 cm³ of hexane.

The polymerization was carried out using a method similar to Example 1 at 70° C.

This gave 3.2 kg of polypropylene powder. The reactor displayed no deposits on the inner wall or stirrer. The catalyst activity was 194 kg of PP/g of metallocene×h. VN=907 cm³/g; m.p.=162° C.; $M_w$=1,329,000 g/mol; $M_w/M_n$=3.3; BD =397 g/dm³.

Example 6

Passivation of the Support Material:

40 ml of 20% strength trimethylaluminum solution in Varsol were slowly added dropwise while stirring to 10 g of $SiO_2$ (PQ MS 3030, PQ Corporation, dried at 140° C. and 10 mbar). Sufficient toluene to form a readily stirrable suspension was then added. The mixture was stirred for another 10 minutes and the solid was then filtered off from the solvent. The filtration residue was washed twice with 10 ml of toluene. The support material which had been pretreated in this way was dried at room temperature in an oil pump vacuum. This gave 18 g of passivated support material. In parallel thereto, 4.5 mg (7.2 μmol of Zr) of dimethylsilane-diylbis(2-methyl-4-phenylindenyl)zirconium dichloride were mixed with 1 cm³ of 30% strength (4.81 mmol) methylaluminoxane solution in toluene and the mixture was stirred for 15 minutes. 1 g of the passivated support material was resuspended in toluene and the above metallocene/methylaluminoxane solution was added dropwise. The reaction mixture was stirred for 30 minutes at room temperature. The mixture was subsequently filtered and the solid was washed 3 times with 10 cm³ of hexane. The hexane-moist filtration residue which remained was resuspended in 20 cm³ of hexane for the polymerization.

Polymerization

In parallel thereto, a dry 16 dm³ reactor was flushed first with nitrogen and subsequently with propylene and charged with 10 dm³ of liquid propylene. 3 cm³ of triisoybutylaluminum (pure, 12 mmol) were then diluted with 30 cm³ of hexane, introduced into the reactor and the mixture was stirred at 30° C. for 15 minutes. The catalyst suspension was subsequently introduced into the reactor, the mixture was heated to the polymerization temperature of 50° C. (4°

C./min) and the polymerization system was held at 50° C. for 1 hour by cooling. The polymerization was stopped by addition of 20 cm³ of isopropanol. The excess monomer was vented, the polymer was dried under reduced pressure.

This gave 990 g of polypropylene powder. The reactor displayed no deposits on the inner wall or stirrer. The catalyst activity was 220 kg of PP/g of metallocene×h. VN=868 cm³/g; m.p.=160° C.; $M_w$=1,275,000 g/mol; $M_w/M_n$=3.4; BD=386 g/dm³.

Example 7

The synthesis of the supported catalyst system of Example 1 was repeated, except that 5 cm³ of 30% strength (24 mmol) methyl-aluminoxane solution in toluene, 1.8 mg of dimethylsilanediyl-bis(2-methyl-4-phenylindenyl) zirconium dichloride (2.9 µmol of Zr) and 3 g of passivated support material were used.

The polymerization was carried out using a method similar to Example 1 at 70° C. This gave 369 g of polypropylene powder. The reactor displayed no deposits on the inner wall or stirrer.

The catalyst activity was 205 kg of PP/g of metallocene×h.

VN=842 cm³/g; m.p.=160° C.; $M_w$=1,229,000 g/mol; $M_w/M_n$=3.2;
BD=373 g/dm³.

Example 8

40 ml of 20% strength triisobutylaluminum solution in Varsol were slowly added dropwise while stirring to 10 g of $SiO_2$ (PQ MS 3030, PQ Corporation, dried at 140° C. and 10 mbar). Sufficient toluene to form a readily stirrable suspension was then added. The mixture was stirred for another 10 minutes and the solid was then filtered off from the solvent. The filtration residue was washed twice with 10 ml of toluene. The support material which had been pretreated in this way was dried in an oil pump vacuum.

Preparation of the Supported Catalyst System

In parallel thereto, 20 mg (32 µmol) of dimethylsilanediylbis-(2-methyl-4-phenylindenyl) zirconium dichloride were mixed with 3 cm³ of 30% strength (14.43 mmol) methylaluminoxane solution and a further 20 ml of toluene. The mixture was stirred for another 30 minutes.

This metallocene/methylaluminoxane solution was then added dropwise while stirring vigorously to 5 g of the passivated support material and the mixture was stirred for another 15 minutes. The mixture was filtered and the solid was washed three times with 10 cm³ of hexane and dried in an oil pump vacuum. 20 ml of toluene were subsequently added and the catalyst system was resuspended.

Polymerization

In parallel thereto, a dry 16 dm³ reactor was flushed first with nitrogen and subsequently with propylene and charged with 10 dm³ of liquid propylene. 3 cm³ of triisobutylaluminum (pure, 12 mmol) were then diluted with 30 cm³ of hexane, introduced into the reactor and the mixture was stirred at 30° C. for 15 minutes. The catalyst suspension was subsequently introduced into the reactor, the mixture was heated to the polymerization temperature of 70° C. (4° C./min) and the polymerization system was held at 70° C. for 1 hour by cooling. The polymerization was stopped by addition of 20 cm³ of isopropanol. The excess monomer was vented, the polymer was dried under reduced pressure.

This gave 2.86 kg of polypropylene powder. The reactor displayed no deposits on the inner wall or stirrer. The catalyst activity was 143 kg of PP/g of metallocene×h. VN=946 cm³/g; m.p.=162° C.; $M_w$=1,374,000 g/mol; $M_w/M_n$=3.0; BD=360 g/dm³.

Example 9

40 ml of 20% strength trimethylaluminum solution in Varsol were slowly added dropwise while stirring to 10 g of $SiO_2$ (PQ MS 3030, PQ Corporation, dried at 140° C. and 10 mbar). Sufficient toluene to form a readily stirrable suspension was then added. The mixture was stirred for another 10 minutes and the solid was then filtered off from the solvent. The filtration residue was washed twice with 10 ml of toluene. The support material which had been pretreated in this way was dried in an oil pump vacuum.

In parallel thereto, a dry 16 dm³ reactor was flushed first with nitrogen and subsequently with propylene and charged with 10 dm³ of liquid propylene. 3 cm³ of triisobutylaluminum (pure, 12 mmol) were then diluted with 30 cm³ of hexane, introduced into the reactor and the mixture was stirred at 30° C. for 15 minutes.

Preparation of the Supported Catalyst System 20 mg (32 µmol) of dimethylsilanediylbis(2-methyl-4-phenyl-indenyl)zirconium dichloride were mixed with 3 ml of 30% strength (14.43 mmol) methylaluminoxane solution in toluene and a further 20 ml of toluene. The mixture was stirred for another 30 minutes at room temperature.

This solution was then added dropwise to 5 g of passivated support material. The mixture was stirred for a further 15 minutes. under. [sic]

The mixture was subsequently filtered and the solid was washed three times with 10 cm³ of hexane. The hexane-moist filtration residue which remained was resuspended in 20 cm³ of toluene for the polymerization.

The catalyst suspension was subsequently introduced into the reactor, the mixture was heated to the polymerization temperature of 20° C. (4° C./min) and the polymerization system was heated [sic] at 70° C. for 1 hour by cooling. The polymerization was stopped by addition of 20 cm³ of isopropanol. The excess monomer was vented, the polymer was dried under reduced pressure.

This gave 2.94 kg of polypropylene powder. The reactor displayed no deposits on the inner wall or stirrer. The catalyst activity was 147 kg of PP/Kg [sic] of metallocene×h. VN=842 cm³/g; m.p.=160° C., $M_w$=1,217,000 g/mol; $M_w/M_n$=2.9; BD=356 g/dm³.

Example 10

40 ml of 20% strength triisobutylaluminum solution in Varsol were slowly added dropwise while stirring to 10 g of $SiO_2$ (PMQS 3030, PQ Corporation, dried at 140° C. and 10 mbar). Sufficient toluene to form a readily stirrable suspension was then added. The mixture was stirred for another 10 minutes and the solid was then filtered off from the solvent. The filtration residue was washed twice with 10 ml of toluene. The support material which had been pretreated in this way was dried in an oil pump vacuum. In parallel thereto, a dry 16 dm³ reactor was flushed first with nitrogen and subsequently with propylene and charged with 10 dm³ of liquid propylene. 3 cm³ of triisobutylaluminum (pure, 12 mmol) were then diluted with 30 cm³ of hexane, introduced into the reactor and the mixture was stirred at 30° C. for 15 minutes.

Preparation of the Supported Catalyst System 20 mg (32 μmol) of dimethylsilanediylbis(2-methyl-4-phenyl-indenyl)zirconium dichloride were mixed with 3 ml of 30% strength (14.43 mmol) methylaluminoxane solution in toluene and a further 20 ml of toluene. The mixture was stirred for another 60 minutes at room temperature. This solution was then added dropwise to 2 g of passivated support material. The mixture was stirred for a further 15 minutes.

The mixture was subsequently filtered and the solid was washed once with 10 cm$^3$ of hexane. The hexane-moist residue which remained was dried in an oil pump vacuum and then resuspended in 20 cm$^3$ of toluene.

The catalyst suspension was subsequently introduced into the reactor, the mixture was heated to the polymerization temperature of 20° C. (4° C./min) and the polymerization system was heated [sic] at 70° C. for 1 hour by cooling. The polymerization was stopped by addition of 20 cm$^3$ of isopropanol. The excess monomer was vented, the polymer was dried under reduced pressure.

This gave 3.26 kg of polypropylene powder. The reactor displayed no deposits on the inner wall or stirrer. The catalyst activity was 163 kg of PP/g. VN=910 cm$^3$/g; m.p.=162° C.; $M_w$=1,323,000 g/mol; $M_w/M_n$=3.0; BD=340 g/dm$^3$.

Example 11

40 ml of 20% strength trimethylaluminum solution in Varsol were slowly added dropwise while stirring to 10 g of SiO$_2$ (PMQS 3030, PQ Corporation, dried at 140° C. and 10 mbar). Sufficient toluene to form a readily stirrable suspension was then added. The mixture was stirred for another 10 minutes and the solid was then filtered off from the solvent. The filtration residue was washed twice with 10 ml of toluene. The support material which had been pretreated in this way was dried in an oil pump vacuum.

In parallel thereto, a dry 16 dm$^3$ reactor was flushed first with nitrogen and subsequently with propylene and charged with 10 dm$^3$ of liquid propylene. 3 cm$^3$ of triisobutylaluminum (pure, 12 mmol) were then diluted with 30 cm$^3$ of hexane, introduced into the reactor and the mixture was stirred at 30° C. for 15 minutes.

Preparation of the Supported Catalyst System 20 mg (32 μmol) of dimethylsilanediylbis(2-methyl-4-phenyl-indenyl)zirconium dichloride were mixed with 3 ml of 30% strength (14.43 mmol) methylaluminoxane solution in toluene and a further 20 ml of toluene. The mixture was stirred for another 30 minutes at room temperature.

This solution was then added dropwise to 2 g of passivated support material. The mixture was stirred for a further 15 minutes.

The mixture was subsequently filtered and the solid was washed once with 10 cm$^3$ of hexane. The hexane-moist residue which remained was dried in an oil pump vacuum and then resuspended in 20 cm$^3$ of hexane.

The catalyst suspension was subsequently introduced into the reactor, the mixture was heated to the polymerization temperature of 20° C. (4° C./min) and the polymerization system was heated [sic] at 70° C. for 1 hour by cooling. The polymerization was stopped by addition of 20 cm$^3$ of isopropanol. The excess monomer was vented, the polymer was dried under reduced pressure.

This gave 3.3 kg of polypropylene powder. The reactor displayed no deposits on the inner wall or stirrer. The catalyst activity was 165 kg of PP/g. VN=874 cm$^3$/g; m.p.=160° C.; $M_w$=1,254,000 g/mol; $M_w/M_n$=2.9; BD=375 g/dm$^3$.

Example 12

40 ml of 20% strength trimethylaluminum solution in Varsol were slowly added dropwise while stirring to 10 g of SiO$_2$ (PMQS 3030, PQ Corporation, dried at 140° C. and 10 mbar). Sufficient toluene to form a readily stirrable suspension was then added. The mixture was stirred for another 10 minutes and the solid was then filtered off from the solvent. The filtration residue was washed twice with 10 ml of toluene. The support material which had been pretreated in this way was dried in an oil pump vacuum.

In parallel thereto, a dry 16 dm$^3$ reactor was flushed first with nitrogen and subsequently with propylene and charged with 10 dm$^3$ of liquid propylene. 3 cm$^3$ of triisobutylaluminum (pure, 12 mmol) were then diluted with 30 cm$^3$ of hexane, introduced into the reactor and the mixture was stirred at 30° C. for 15 minutes.

Preparation of the Supported Catalyst System 20 mg (32 μmol) of dimethylsilanediylbis(2-methyl-4-phenyl-indenyl)zirconium dichloride were mixed with 3 ml of 30% strength (14.43 mmol) methylaluminoxane solution in toluene and a further 6 ml of toluene. The mixture was stirred for another 30 minutes at room temperature.

This solution was then added dropwise to 2 g of passivated support material. The mixture was stirred for a further 15 minutes and the catalyst system was resuspended in 20 ml of toluene.

The catalyst suspension was subsequently introduced into the reactor, the mixture was heated to the polymerization temperature of 20° C. (4° C./min) and the polymerization system was heated [sic] at 70° C. for 1 hour by cooling. The polymerization was stopped by addition of 20 cm$^3$ of isopropanol. The excess monomer was vented, the polymer was dried under reduced pressure.

This gave 3.42 kg of polypropylene powder. The reactor displayed no deposits on the inner wall or stirrer. The catalyst activity was 171 kg of PP/g. VN=868 cm$^3$/g; m.p.=161° C.; $M_w$=1,254,000 g/mol; $M_w/M_n$=3.2; BD=360 g/dm$^3$.

As Comparative Examples 1 to 3, the Examples 3, 4 and 5 from the Patent Application EP 576 970 A1 have been incorporated into the present description.

Comparative Example 1

22 cm$^3$ of the suspension of the "MAO on SiO$_2$" (49 mmol of Al) were introduced under argon into a G3 Schlenk frit and admixed with a solution of 4.5 mg of dimethylsilanediylbis(2-methyl-4-phenyl-indenyl)zirconium dichloride in 10 cm$^3$ of toluene (7.2 μmol of Zr).

The reaction mixture was stirred at room temperature for 30 minutes, with a spontaneous color change to red gradually becoming paler. The mixture was subsequently filtered and the solid was washed 3 times with 10 cm$^3$ of hexane. The hexane-moist filtration residue which remained was resuspended in 20 cm$^3$ of hexane for the polymerization.

In parallel thereto, a dry 16 dm$^3$ reactor was flushed first with nitrogen and subsequently with propylene and charged with 10 dm$^3$ of liquid propylene. 3 cm$^3$ of triisobutylaluminum (pure, 12 mmol) were then diluted with 30 cm$^3$ of hexane, introduced into the reactor and the mixture was stirred at 30° C. for 15 minutes. The catalyst suspension was subsequently introduced into the reactor, the mixture was heated to the polymerization temperature of 50° C. (4° C./min) and the polymerization system was held at 50° C. for 1 hour by cooling. The polymerization was stopped by addition of 20 cm³ of isopropanol. The excess monomer was vented, the polymer was dried under reduced pressure.

This gave 300 g of polypropylene powder. The reactor displayed no deposits on the inner wall or stirrer. The catalyst activity was 67 kg of PP/g of metallocene×h. VN=1380 cm³/g; m.p.=156° C.

Comparative Example 2

The synthesis of the supported catalyst system of Comparative Example 1 was repeated, except that 13 cm³ (29 mmol of Al) of the suspension of "MAO on $SiO_2$" and 1.8 mg of rac-5 (2.9 µmol of Zr) were used.

The polymerization was carried out using a method similar to Comparative Example 1 at 70° C. This gave 420 g of polypropylene powder. The reactor showed no deposits on the inner wall or stirrer. The catalyst activity was 233 kg of PP/g of metallocene×h. VN=787 cm³/g; m.p.=149.5° C.

Comparative Example 3

40 The synthesis of the supported catalyst system of Comparative Example 1 was repeated, except that 150 cm³ (335 mmol of Al) of the suspension of "MAO on $SiO_2$" and 44.2 mg (70.3 µmol of Zr) were used and the reaction mixture was stirred for 60 minutes at room temperature.

The solid was subsequently filtered off and washed 3 times with 50 cm³ of hexane. The hexane-moist filtration residue which remained was dried under reduced pressure to give a free-flowing, pale pink powder. This gave 33.3 g of supported, dry catalyst. For the polymerization, 2.98 g (4 mg =6.3 µmol of Zr) of this dry catalyst were resuspended in 20 cm³ of hexane.

The polymerization was carried out using a method similar to Comparative Example 1 at 70° C.

This gave 1.05 kg of polypropylene powder. The reactor displayed no deposits on the inner wall or stirrer. The catalyst activity was 263 kg of PP/g of metallocene×h. VN=944 cm³/g; m.p.=156°m C.

Comparative Example 4

Preparation of the Supported Catalyst System 6.5 cm³ of the suspension of "MAO on $SiO_2$" (14.4 mmol of Al) were introduced into a G3 Schlenk frit and mixed with a solution of 20 mg (32 µmol) of dimethylsilanediylbis(2-methyl-4-phenyl-indenyl)zirconium dichloride in 10 cm³ of toluene and a further 20 ml of toluene. The mixture was stirred for another 30 minutes at room temperature.

The mixture was subsequently filtered and the solid was washed three times with 10 cm³ of hexane. The hexane-moist filtration residue which remained was resuspended in 20 cm³ of hexane for the polymerization.

In parallel thereto, a dry 16 dm³ reactor was flushed first with nitrogen and subsequently with propylene and charged with 10 dm³ of liquid propylene. 3 cm³ of triisobutylaluminum (pure, 12 mmol) diluted with 30 cm³ of hexane were then introduced into the reactor and the mixture was stirred at 30° C. for 15 minutes.

The catalyst suspension was subsequently introduced into the reactor, the mixture was heated to the polymerization temperature of 20° C. (4° C./min) and the polymerization system was heated [sic] at 70° C. for 1 hour by cooling. The polymerization was stopped by addition of 20 cm³ of isopropanol. The excess monomer was vented, the polymer was dried under reduced pressure.

This gave 3.45 kg of polypropylene powder. The reactor displayed no deposits on the inner wall or stirrer. The catalyst activity was 172 kg of PP/g of metallocene×h. M.p.=149° C.; VN=872 cm³/g; $M_w$=1,290,000 g/mol; $M_w/M_n$=2.9; BD=410 g/dm³.

Comparative Example 5

Preparation of the Supported Catalyst System 5 g of $SiO_2$ (PQMS 3030, PQ Corporation, dried at 140° C. and 10 mbar) were suspended in 30 ml of toluene and admixed with the following metallocene/MAO/toluene solution.

20 mg (32 µmol) of dimethylsilanediylbis(2-methyl-4-phenyl-indenyl)zirconium dichloride were mixed with 3 ml of 30% strength (14.43 mmol) methylaluminoxane solution in toluene and a further 10 ml of toluene. The mixture was stirred for another 30 minutes at room temperature.

In parallel thereto, a dry 16 dm³ reactor was flushed first with nitrogen and subsequently with propylene and charged with 10 dm³ of liquid propylene. 13 cm³ instead of 3 cm³ of 20% strength triisobutylaluminum solution in vargol [sic] were then introduced into the reactor and the mixture was stirred at 30° C. for 15 minutes.

The catalyst suspension was subsequently introduced into the reactor, the mixture was heated to the polymerization temperature of 20° C. (4° C./min) and the polymerization system was heated [sic] at 70° C. for 1 hour by cooling. The polymerization was stopped by addition of 20 cm³ of isopropanol. The excess monomer was vented, the polymer was dried under reduced pressure.

This gave 3.58 kg of polypropylene powder. The reactor displayed no deposits on the inner wall or stirrer. The catalyst activity was 179 kg of PP/g. VN=910 cm³/g; m.p.=149° C.; $M_w$=1,328,0000 [sic] g/mol; $M_w/M_n$=3.3; BD=95 g/dm³.

Table 2 below indicates which examples are compared with which comparative examples.

TABLE 2

| Examples | Comparative Example |
|---|---|
| 1, 4, 6 | 1 |
| 2, 7 | 2 |
| 3, 5 | 3 |
| 8, 9, 10, 11, 12 | 4, 5 |

Table 3 below shows the characteristic data of the catalyst system and the polymers obtained.

TABLE 3

| Examples (E) Comparative Examples (C) | Cat. activity[1] | VN[2] | m.p.[3] | $M_w$[3] | $M_w/M_n$[5] | BD[6] | TT[7] | RI[8] |
|---|---|---|---|---|---|---|---|---|
| E1 | 242 | 793 | 160 | 1155000 | 3.2 | 356 | 98.2 | 0.09 |
| E2 | 267 | 811 | 161 | 1182000 | 3.2 | 343 | 98.7 | 0.09 |
| E3 | 238 | 824 | 160 | 1194000 | 3.0 | 377 | 98.2 | 0.11 |

TABLE 3-continued

| Examples (E) Comparative Examples (C) | Cat. activity[1] | VN[2] | m.p.[3] | $M_w$[4] | $M_w/M_n$[5] | BD[6] | TT[7] | RI[8] |
|---|---|---|---|---|---|---|---|---|
| E4  | 199 | 812  | 161   | 1188000 | 3.3 | 380 | 99.3 | 0.10 |
| E5  | 194 | 907  | 162   | 1329000 | 3.3 | 397 | 99.5 | 0.07 |
| E6  | 220 | 868  | 160   | 1275000 | 3.4 | 386 | 98.5 | 0.08 |
| E7  | 205 | 842  | 160   | 1229000 | 3.2 | 373 | 98.2 | 0.09 |
| E8  | 143 | 946  | 162   | 1374000 | 3.0 | 360 | 99.5 | 0.06 |
| E9  | 147 | 842  | 160   | 1217000 | 2.9 | 356 | 98.9 | 0.10 |
| E10 | 163 | 910  | 162   | 1323000 | 3.0 | 340 | 99.1 | 0.09 |
| E11 | 165 | 874  | 160   | 1254000 | 2.9 | 375 | 99.2 | 0.11 |
| E12 | 171 | 868  | 161   | 125000  | 3.2 | 360 | 98.5 | 0.06 |
| C1  | 67  | 1380 | 156   | —       | —   | —   | —    | —    |
| C2  | 223 | 787  | 149.5 | —       | —   | —   | —    | —    |
| C3  | 263 | 944  | 156   | —       | —   | —   | —    | —    |
| C4  | 172 | 872  | 149   | 1290000 | 2.9 | 410 | 94.7 | 0.43 |
| C5  | 179 | 910  | 149   | 1328000 | 3.3 | 395 | 95.4 | 0.49 |

[1]Catalyst activity in kg of PP/g of metallocene × h
[2]Viscosity number in cm³/g
[3]Melting point in ° C.; determined using DSC, 20° C./min heating/cooling rate; second heating
[4]Weight average molar mass in g/mol; determined by gel permeation chromatography
[5]Polydispersity
[6]Polymer bulk density in g/dm³
[7]Triad tacticity TT = mm/(mm + mr + rr) · 100 in %; determined by $^{13}$C-NMR spectroscopy
[8]Reverse insertions in %; determined by $^{13}$C-NMR spectroscopy 1) Catalyst activity in kg of PP/g of metallocene×h
2) Viscosity number in cm³/g
3) Melting point in ° C.; determined using DSC, 20° C./min heating/cooling rate; second heating
4) Weight average molar mass in g/mol; determined by gel permeation chromatography
5) Polydispersity
6) Polymer bulk density in g/dm³
7) Triad tacticity TT=mm/(mm+mr+rr)·100 in %; determined by $^{13}$C-NMR spectroscopy
8) Reverse insertions in %; determined by $^{13}$C-NMR spectroscopy Comparison of the Examples E1 to E12 carried out according to the present invention with the Examples C1 to C4 carried out according to the prior art shows the following advantages of the invention.

1. Polymers of the invention having melting points of from 160° C. to 162° C. compared to 149° C. to 156° C. were obtained.
2. The proportion of 2-1-inserted propene units (RI) was significantly lower in the polymers of the present invention.

Comparison of Examples E1 to E12 with Comparative Example C5 showed that polymers having high melting points (≧160° C.) were obtained only when using passivated support material.

We claim:

1. A catalyst system comprising at least one passivated support and at least one metallocene having the formula I (I)

where $M^1$ is a metal of group IVb of the Periodic Table of the Elements, $R^1$ and $R^2$ are identical or different and are each a hydrogen atom, a $C_1$–$C_{10}$-alkyl group, a $C_1$–$C_{10}$-alkoxy group, a $C_6$–$C_{20}$-aryl group, a $C_6$–$C_{10}$-aryloxy group, a $C_2$–$C_{10}$-alkenyl group, an OH group, an $NR^{12}_2$ group, where $R^{12}$ is a $C_1$–$C_2$-alkyl group or a $C_6$–$C_{14}$-aryl group, or a halogen atom, $R^5$ and $R^{5'}$ are identical or different and are each a $C_1$–$C_{40}$-hydrocarbon group which may be linear, cyclic or branched, $R^3$ to $R^4$, $R^6$ to $R^8$, $R^{3'}$ to $R^{4'}$ and $R^{6'}$ to $R^{8'}$ are identical or different and are each a hydrogen atom or a $C_1$–$C_{40}$-hydrocarbon group which may be linear, cyclic or branched, or adjacent radicals $R^6$ to $R^8$ and/or $R^{6'}$ to $R^{8'}$ together with the atoms connecting them form a ring system, $R^9$ is a bridge, selected from the group consisting of

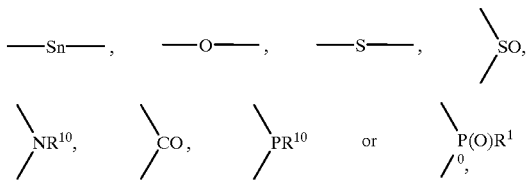

where $R^{10}$ and $R^{11}$ are identical or different and are each a hydrogen atom, a halogen atom or a $C_1$–$C_{40}$-group such as a $C_1$–$C_{20}$-alkyl, a $C_1$–$C_{10}$-fluoroalkyl group, a $C_1$–$C_{10}$-alkoxy group, a $C_6$–$C_{14}$-aryl group, a $C_6$–$C_{10}$-fluoroaryl group, a $C_6$–$C_{10}$-aryloxy group, a $C_2$–$C_{10}$-alkenyl group, a $C_7$–$C_{40}$-arylalkyl group, a $C_7$–$C_{40}$-alkylaryl group or a $C_8$–$C_{40}$-arylalkenyl group, or $R^{10}$ and $R^{11}$, in each case together with the atoms connecting them, form one or more rings and x is an integer from zero to 18, $M^2$ is silicon, germanium or tin, and the rings A and B are identical or different, saturated or unsaturated.

2. A catalyst system as claimed in claim 1, wherein $R^5$ and $R^{5'}$ are identical or different and are each a $C_1$–$C_{10}$-alkyl group, a $C_2$–$C_{10}$-alkenyl group, a $C_6$–$C_{20}$-aryl group, a $C_7$–$C_{40}$-arylalkyl group, a $C_7$–$C_{40}$-alkylaryl group or a $C_8$–$C_{40}$-arylalkenyl group, and $R^3$ to $R^4$, $R^6$ to $R^8$, $R^{3'}$ to $R^{4'}$ and $R^{6'}$ to $R^{8'}$ are identical or different and are each a hydrogen atom a $C_1$–$C_{10}$-alkyl group, a $C_2$–$C_{10}$-alkenyl group, a $C_6$–$C_{20}$-aryl group, a $C_7$–$C_{40}$-arylalkyl group, a $C_7$–$C_{40}$-alkylaryl group or a $C_8$–$C_{40}$-arylalkenyl group, or adjacent radicals $R^6$ to $R^8$ and/or $R^{6'}$ to $R^{8'}$ together with the atoms connecting them form a ring system.

3. A catalyst system as claimed in claim 2, wherein $R^5$ and $R^{5'}$ are identical or different and are each $C_6$–$C_{20}$-aryl group or a $C_7$–$C_{40}$-alkylaryl group.

4. A process for producing a polymer comprising polymerized monomer units of $C_3$–$C_{20}$-olefins and having a proportion of reverse insertions of <0.2% and a triad tacticity of >98.0% comprising polymerizing $C_3$–$C_{20}$-olefins in the presence of the catalyst system as claimed in claim 1.

5. A catalyst system as claimed in claim 1 comprising at least one metallocene selected from among dimethylsilanediylbis(2-methylindenyl)zirconium dichloride, dimethylsilanediylbis(2-methyl-4-(1-naphthyl) indenyl)-zirconium dichloride, dimethylsilanediylbis(2-methyl-4-phenylindenyl)zirconium dichloride, dimethylsilanediylbis(2-methyl-4-α-acenaphthindenyl) zirconium dichloride, dimethylsilanediylbis(2-ethyl-4-phenylindenyl)zirconium dichloride, dimethylsilanediylbis (2-methyl-4,5-benzindenyl)-zirconium dichloride, dimethylsilanediylbis(2-methyl-4,6-diisopropylindenyl) zirconium dichloride.

6. A catalyst system as claimed in claim 1 comprising at least one cocatalyst.

7. A catalyst system as claimed in claim 1 comprising at least one passivated, inorganic oxide.

8. A process for preparing a catalyst system as claimed in claim 1, which comprises passivating at least one support and combining the passivated support with at least one metallocene of formula (I).

9. A process for preparing a catalyst system as claimed in claim 6, which comprises passivating at least one inorganic oxide and mixing the passivated support with at least one metallocene of formula (I).

* * * * *